(No Model.) 2 Sheets—Sheet 2.
G. C. BAKER.
WIRE BARBING MACHINE.
No. 295,513. Patented Mar. 25, 1884.
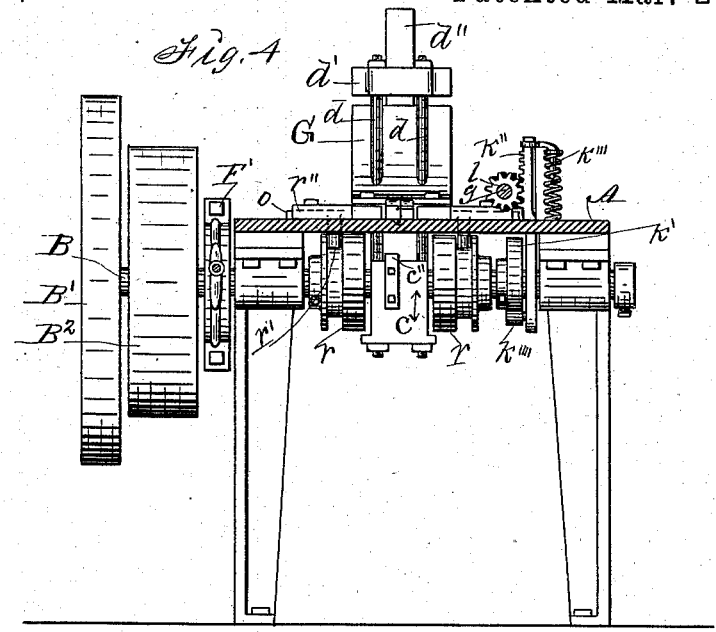
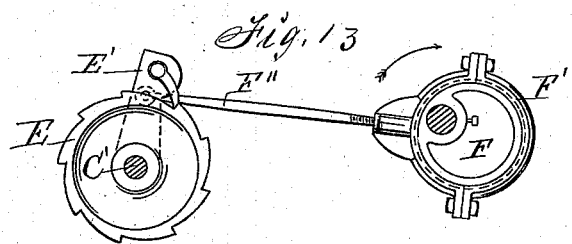
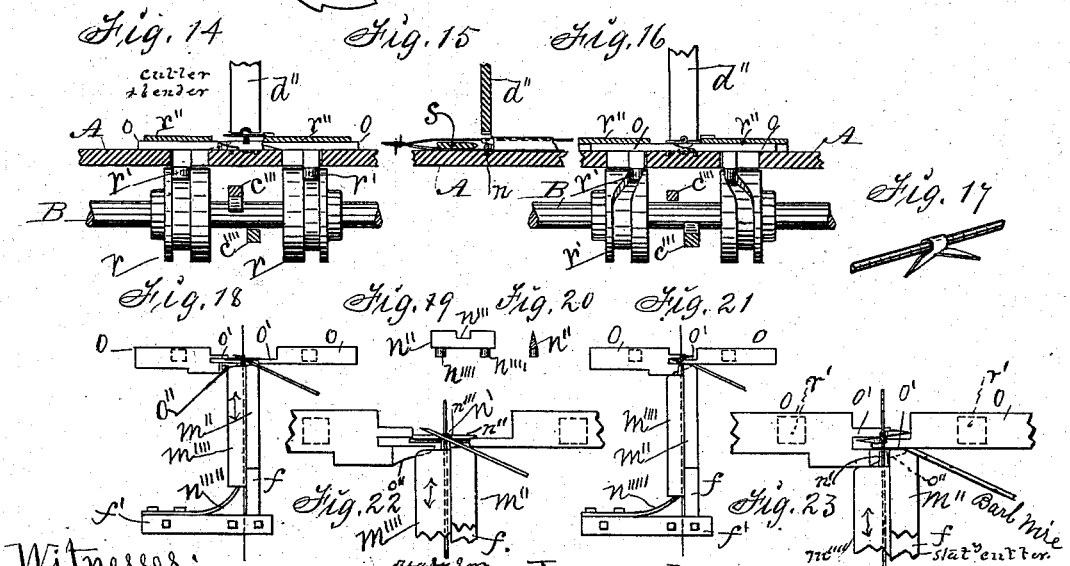
Witnesses:
E. W. Smith
H. A. Sollenberg
Inventor:
George C. Baker,
By Thomas G. Orwig, Attorney

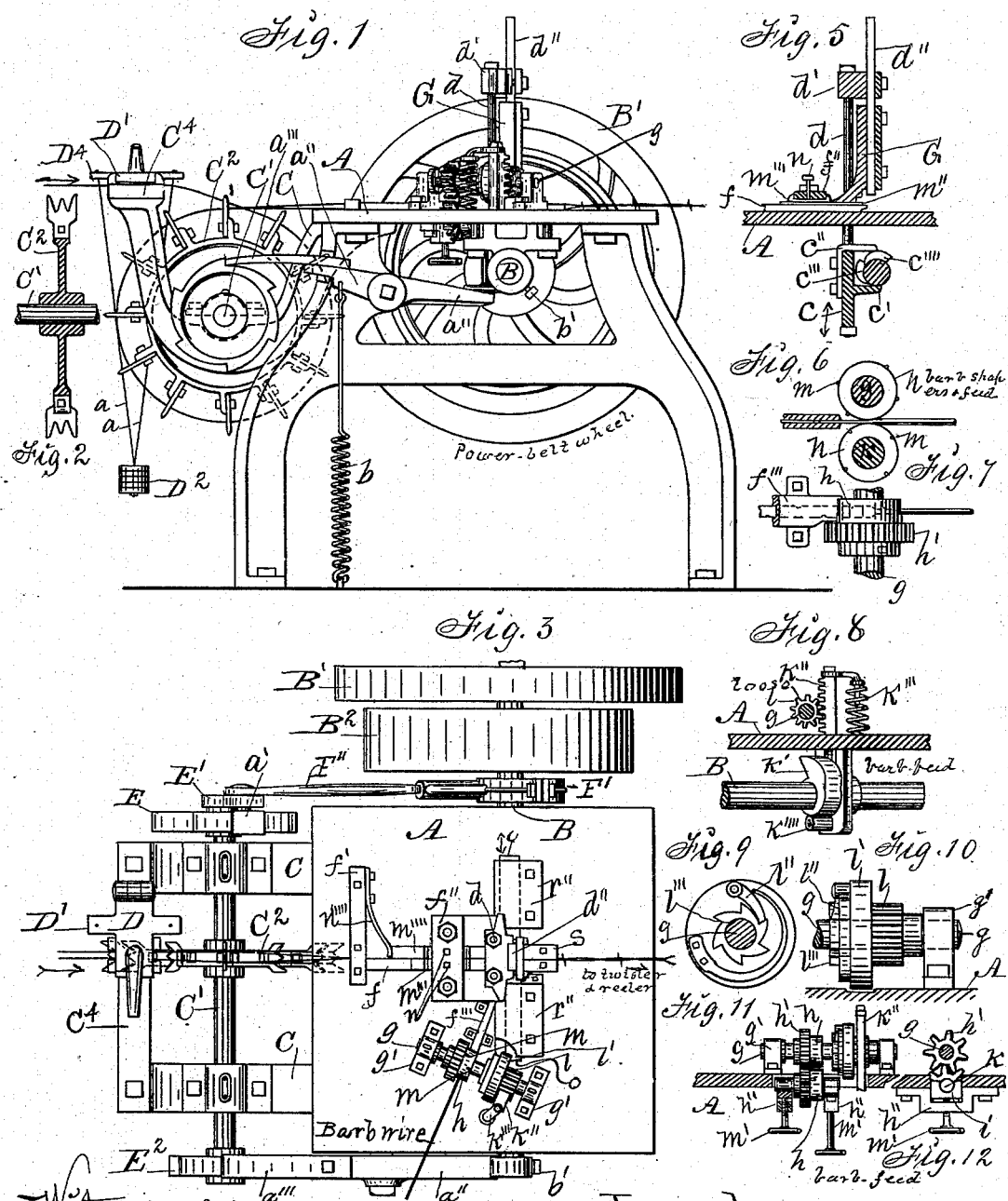

UNITED STATES PATENT OFFICE.

GEORGE C. BAKER, OF DES MOINES, IOWA.

WIRE-BARBING MACHINE.

SPECIFICATION forming part of Letters Patent No. 295,513, dated March 25, 1884.

Application filed July 16, 1883. (No model.)

*To all whom it may concern:*

Be it known that I, GEORGE C. BAKER, of Des Moines, in the county of Polk and State of Iowa, have invented an Improved Barb-Forming and Wire-Barbing Machine, of which the following is a specification.

My object is to provide a machine specially adapted for making and applying to fence-wire a flat barb-piece similar to the barb patented by me February 27, 1883, No. 273,219; and my invention consists in forming, arranging, and combining barb-feeding, barb-pressing, barb-notching, barb-cutting, barb-bending, barb-spacing, and barb-fixing mechanism with a single driving-shaft, as hereinafter fully set forth, in such a manner that barbs can be successively formed at regular intervals from a round wire or flat metal strip and placed astride of a fence-wire by the rectilinear motions of the cutter, and the barb-points then crossed and bent in opposite directions and firmly fastened upon a fence-wire by the joint action of two horizontal slides in place of the intermittent motions of rotating coiling devices heretofore generally used for applying barbs to fence-wire.

Figure 1 of my accompanying drawings is a side view. Fig. 2 is a sectional view of the sprocket-wheel; Fig. 3, a top view, and Fig. 4 an end view, of my machine. Figs. 5 to 23, inclusive, are detail views, and all correspond in size with the scale of Figs. 1, 2, and 3, excepting Figs. 7, 8, 9, 10, 16, 19, 20, 22, and 23, which figures are made on an enlarged scale. Jointly considered, these figures clearly illustrate the construction and operation of my complete invention.

A is a metal base-plate rigidly fixed upon a suitable frame, preferably a cast-metal frame.

B is the driving-shaft, mounted in bearings fixed to the frame to extend horizontally across underneath the plate A.

B' is a belt-wheel fixed to the end of the shaft B.

B² is a belt-wheel designed to transmit power from the shaft B to reeling and twisting mechanisms. (Not shown.)

C C are brackets fixed to the front end of the frame and base A.

C' is a shaft mounted in bearings fixed to the brackets C.

C² is a duplex sprocket-wheel detachably fixed to the shaft C', and adapted to support and move two parallel fence-wires at regular intervals of time. The bearings for the two wires are clearly shown in Figs. 2 and 3.

C⁴ is a cross-piece fixed to the ends of the brackets C to form a support and bearing for the parallel wires that are moved over it (from a spool, not shown) to the duplex sprocket-wheel C².

D is a friction-plate, hinged to the cross-piece C⁴ in such a manner that its under side will rest flat upon the top surface of the cross-piece and the parallel fence-wires extending under it.

D' are arms extending laterally from the opposite sides of the plate D, from which arms a weight, D², is suspended by means of cords *a*, as clearly shown in Fig. 1, to produce friction sufficient to keep the parallel wires stretched tight around the sprocket-wheel, as required, to be advanced to the barb-forming and barb-fastening mechanisms at regular intervals of time to have the barbs fixed thereon at regular distances apart.

E is a ratchet-wheel fixed to the end of the shaft C'.

E' is a lever pivoted on the same end of the same shaft and on the outside of the ratchet-wheel. A pawl, *a'*, pivoted to the free end of the lever, engages the teeth of the ratchet-wheel.

F (clearly shown in Fig. 13) is an eccentric fixed to the driving-shaft B.

F' is a collar formed in two sections, placed over and loosely around the periphery of the eccentric.

F" is a pitman-rod connecting the collar F' and the pivoted lever E' in such a manner that every revolution of the shaft B and eccentric F will impart an intermittent motion to the shaft C' and the sprocket-wheel C² and advance the parallel wires.

*a"* (clearly shown in Fig. 1) is a trip-lever, pivoted to the frame in such a manner that a pawl, *a'''*, fixed thereto will engage a ratchet-wheel, E², fixed to the end of the shaft C' at the opposite side of the machine from the ratchet-wheel E.

*b* is a spring fixed to the floor and the lever *a"* in such a manner that in its normal position it will hold the pawl $a'''$ in contact with one of the teeth of the wheel $E^2$, as required, to retain the sprocket-wheel $C^2$ and the parallel fence-wires stationary at regular intervals of time and space while the barbs are being fastened to one of the parallel wires.

$b'$ is a cam on the end of the driving-shaft B, that engages the short arm of the trip-lever $a''$ at every revolution of the shaft and depresses it to lift the pawl $a'''$, as required, to free the shaft $C'$ and wheel $C^2$, and thereby allow the parallel wires to be advanced at regular intervals.

G (clearly shown in Figs. 3 and 5) is a post fixed on the top and center of the base A, to support barb-cutting mechanism.

$c$ is a movable frame below the base A, that has extensions $c'$ and $c''$, that project toward the shaft B.

$c'''$ and $c''''$ are cams fixed to the shaft B, to engage the extensions, and thereby alternately lift and depress the frame $c$.

$d$ $d$ are bolts fixed in parallel position to the frame $c$ at their lower ends, and to a cross-head, $d'$, at their top ends. They extend through bearings formed in the inclined portion of the post G.

$d''$ is a barb-cutter and barb-bender, made of a plain angular piece of steel, fixed to the cross-head $d'$. It has a transverse groove across its square bottom, as clearly shown in Fig. 14, to engage a straight barb-piece when it extends horizontally over one of the fence-wires, and bend it double and astride of the wire preparatory to bending the ends of the barb in opposite directions across the fence-wire, as required to fasten it to the wire, and as shown in Figs. 16, 17, 21, and 23.

$f$ (shown in Figs. 3, 5, 18, 21, 22, and 23) is a stationary cutter fixed on the top of the base A in parallel position, with the parallel wires in such a position that the square edge of the vertically-moving cutter and bender $d''$ will cut off a barb every time it descends past the square end and cutting-edge of the horizontal cutter $f$.

$f'$ is a bar fixed on the base A at right angles to the cutter $f$ and against the rear end thereof.

$f''$ is a block fixed across the cutter $f$ and upon the foot of the post G.

$f'''$ (shown in Figs. 3 and 7) is a guide fixed on the top of the base A in an inclined position relative to the square cutting-edges of the cutters $d''$ and $f$, to direct a flat metal strip to the cutters.

$g$ (shown in Figs. 3, 12, and 7) is a short shaft, mounted on the base A by means of bearers $g'$ at right angles to the inclined guide $f'''$.

$h$ is a feed-roller fixed to the shaft $g$.

$h'$ is a pinion fixed to the same shaft.

$h''$ (clearly shown in Fig. 12) is one of a pair of brackets fixed on the under side of the base A, to support an adjustable shaft-bearing, $i$.

$k$ is a shaft mounted in the bearings $i$ in parallel position, with the shaft $g$ on the top of the base. A second pinion, $h^i$, is fixed to the shaft $k$, to engage its mating pinion on the shaft $g$. An opening in the base A allows these mating pinions and feed-rollers to come in contact with each other.

$k'$ (shown in Figs. 4 and 8) is a cam fixed to the shaft B.

$k''$ is a rack that extends vertically through an opening in the base A, and is connected with the shaft B at its lower end by means of a bridle.

$k'''$ is a spring fixed to the top of the base A and the top of the rack $k''$ in such a manner that it will in its normal condition hold the rack up.

$k''''$ is an anti-friction roller attached to the side and lower end of the bridle and rack $k''$ in such a manner that it will be engaged by the cam $k'$ at every revolution of the shaft B, and the rack thereby depressed.

$l$ is a pinion placed loosely upon the shaft $g$ to engage the rack $k''$.

$l'$ is a flange formed integral with the end of the pinion $l$.

$l''$ is a pawl pivoted to the face of the flange $l'$, to engage a ratchet-wheel, $l'''$, that is fixed to the shaft $g$ in such a manner that the downward motion of the rack will rotate the pinion, and also the shaft, but rotate the pinion only in its upward motion, as required to transmit intermittent rotary motions to the shafts $g$ and $k$ and their mating feed-rollers $h$, for the purpose of advancing a flat metal strip through the guide $f'''$, to be cut into barb-pieces of uniform length at regular intervals.

$m$ $m$ are projections on the peripheries of the upper feed-roller, $h$, at regular distances apart, and on the opposite edges of the roller. Corresponding depressions are formed in the under feed-roller in the manner roller dies are made, to make the feed-rollers perform the function of barb-notches and to cut notches in the opposite edges of a strip of barb metal as it is advanced between the rollers, for the purpose of producing the patented barb hereinbefore referred to.

$m'$ are set-screws that extend through the brackets $h''$ and into the bearings $i$ of the shaft $k$, for the purpose of adjusting the shaft $k$ and the lower roller or die, $h'$, relative to the upper roller, $h$, and shaft $g$. By means of this adjusting device a wire may be readily pressed flat as it is passed through between the feed-rollers, as shown in Figs. 6 and 7.

$m''$ (shown clearly in Figs. 5, 22, and 23) is a flat bar on top of the horizontal cutter. Its front end is cut off diagonally to form an inclined shoulder and guide to direct the end of the flat metal strip relative to the cutting-edges of the cutters, as required to cut off a barb-piece.

$m'''$ (shown in Figs. 3 and 5) are friction-plates placed under the guide-plate $f'''$, one on top of the knife $f$ and the other on top of the sliding bar $m''''$.

$n$ are set-screws that extend through the plate $f''$ to the plates $m'''$, to regulate their pressure and friction.

$n'$ is a finger on the front end of the sliding bar $m''''$, that projects under the barb and fence-wire as the cutter and bender $d''$ descends.

$n''$ (shown in Figs. 19 and 20) is a short triangular-shaped bar, provided with a notch, $n'''$, in its top and center, and with dowel-pins $n''''$ at its bottom. This bar is placed upon the base A in such a position relative to the cutters $d''$ and $f$ that the center of each barb will be over the center of the notch $n'''$ and the finger $n'$ of the sliding bar $m''''$ in the notch when the cutter and bender descends to sever the barb and to bend its points downward on opposite sides of the bar $n''$, as required to place the barb astride of the fence-wire.

$n'''''$ is a spring fixed to the bar $f'$ in such a manner that it will in its normal condition press the sliding bar $m''''$ and its finger $n'$ through the notch $n'''$ of the bar $n''$.

$o$ $o$ are sliding barb-benders, provided with extensions $o'$ at their ends, that are adapted in form to engage the ends of the barbs after they are doubled over the fence-wire, and to press them in opposite directions and into crossed positions, as shown in Fig. 17, and as required to fasten it to the wire.

$o''$ is a cam on the end of one of the slides $o$, that engages the end of the bar $m''''$ and pushes it backward relative to the spring $n'''''$, as required to withdraw the finger $n'$ before the ends of the barb are crossed under the fence-wire. The under part of the end of the cutter $f$ is cut away to admit the cam $o''$.

$r$ $r$ are cam-wheels fixed to the shaft B to engage studs $r'$ on the bottoms of the slides $o$ in such a manner that they will impart reciprocating motions to the slides at every revolution of the shaft B.

$r''$ are bearings for the slides $o$, fixed to the base A.

$s$ (shown in Figs. 3 and 15) is a plate fixed to the base A, to keep the two parallel fence-wires separated until after the barbs are fixed on the upper wire. A groove in the surface of the base-plate A allows the under fence-wire to pass, and a groove in the bar $m''''$ allows the upper wire to pass in parallel position with the under one until the barbs are fixed upon the upper one, when the two strands are twisted together, and the complete barbed cable coiled upon a spool at the rear end of the machine.

From the foregoing detailed description of the construction and function of each element and sub-combination, the unitary actions of all the parts and the practical operation of my complete invention will be apparent to all persons familiar with the art to which it pertains.

I claim as my invention—

1. In a wire-barbing machine, a pair of feed-rollers having coinciding projections and notches in the opposite edges of their peripheries, to adapt them to notch the edges of a metal strip as it is advanced toward the barb-cutters between the rollers.

2. The driving-shaft B, having a cam, $k'$, the rack $k''$, having a bridle at its lower end, and a stud-roller, $k''''$, the spring $k'''$, and the feed-rolls $h$ and $h'$, the shaft $g$, having a loose pinion, $l$ $l'$, a pawl, $l''$, and a fixed ratchet, $l'''$, arranged and combined substantially as shown and described, for the purposes specified.

3. The post G, fixed to the base A, the cutter-carrier $c$ $c'$ $c''$ $d$ $d'$, the cutter $d''$, and the driving-shaft B, having cams $c'''$ and $c''''$, arranged and combined substantially as shown and described, for the purposes specified.

4. The horizontal cutter $f$, the barb-guide $m''$, the sliding bar $m''''$, having a finger, $n'$, the triangular-shaped bar $n$ $n'''$, and the vertical cutter and bender $d''$, having a transverse groove in its end, arranged and combined substantially as shown and described, to simultaneously cut and bend a barb double, in the manner and for the purposes specified.

5. The sliding bar $m''''$, having a finger, $n'$, the triangular bar $n$ $n'''$, the sliding barb-bender $o$ $o'$, having a cam, $o''$, and the spring $n'''''$, arranged and combined substantially as shown and described, for the purposes specified.

6. The driving-shaft B, having cams $r$ $r$, in combination with the sliding barb-benders $o$ $o'$, having studs $r'$, substantially as and for the purposes set forth.

GEORGE C. BAKER.

Witnesses:
CARROLL WRIGHT,
C. C. GILBERT.